Patented Sept. 25, 1951

2,569,420

UNITED STATES PATENT OFFICE 2,569,420

METHOD OF PREPARING ADDUCTS

Milton Kosmin, Dayton, Ohio, assignor to Monsanto Chemical Company, St. Louis, Mo., a corporation of Delaware No Drawing. Application February 15, 1950,
Serial No. 144,385

19 Claims. (Cl. 260—404.8)

This invention relates to improvements in the preparation of adducts formed by the addition reaction of maleic anhydride with olefinic, non-conjugated fatty acids of from 10 to 24 carbon atoms and esters of said acids. It has particular reference to improving the color and clarity of such adducts.

The preparation of adducts by reaction of maleic anhydride with unsaturated fatty acids is well-known (see U. S. Patent No. 2,188,882 to Clocker and the article by Ross, Gebhart and Gerecht in the Journal of the American Chemical Society, p. 1373 (1946)). While the structure of such adducts has not been definitely determined, it is believed that addition of the fatty acid or ester thereof, occurs at the double bond of the dicarboxylic component. For example, the maleic anhydride-oleic acid adduct probably has the structure:

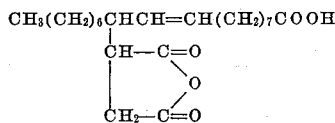

Owing to uncertainty of the position of the fatty acid carbon at which attachment of the dicarboxylic residue accurs, as well as for the sake of brevity, the term "adducts" employed hereinafter will refer to the equimolar addition products of maleic anhydride and a fatty acid compound having the general formula

YCOOZ wherein Y is an olefinic, aliphatic, hydrocarbon residue of from 9 to 23 carbon atoms and Z is an alkyl group of from 1 to 8 carbon atoms or hydrogen.

Such adducts are compounds of great potential use in the chemical and related industries. Actual utilization of the adducts however, has been somewhat limited by their poor color. For example, when following the procedure employed in the Clocker patent there are generally obtained, even when using very pure grades of reactants, opaque reaction materials of a dark color that makes them unsuitable for many uses for which they could be otherwise employed.

Accordingly, an object of the present invention is to provide a method for improving the color of such adducts.

Another object of the invention is to provide a method for preventing, or at least minimizing decolorization of the product in the addition reaction of maleic anhydride and monoolefinic, unsubstituted fatty acids.

These and other objects of the invention may be accomplished by the process of the invention in which the condensation of maleic anhydride and an olefinic, non-conjugated, unsubstituted fatty acid is conducted in the presence of boron compounds hereinafter disclosed.

While I do not know the mechanism of the color-inhibiting effect of the boron compounds when employed in the reaction mixture, it may be assumed that they either react with some impurity or impurities that may be present in the reactants or that they retard side reactions, which contribute to the darkening of the desired adducts. Inasmuch as the addition reaction readily takes place in the absence of the boron compounds, the action of the added material cannot be considered to be catalytic. Only very small quantities of the boron compound need to be employed, say, from 0.5 per cent by weight to 5 per cent by weight of the maleic anhydride employed. Less than 0.3 per cent generally has substantially no decolorizing effect and while quantities in excess of 5 per cent may be employed, for purposes of economy it is preferred to limit the range of the additive to not more than 5 per cent, this quantity being sufficient to give adducts of greatly improved color.

Boron compounds employed in the present invention are members of the group consisting of boric anhydride, boric acids, and the salts and esters of boric acids. Suitable boric acids useful in the practice of this invention are orthoboric acid, metaboric acid and tetraboric acids. Salts of the boric acids which may be employed comprise the alkali, alkaline earth or metal salts of the boric acids, for example, sodium tetraborate, or its decahydrate, borax, potassium metaborate, calcium metaborate and lead metaborate. As illustrative of the useful boric acid esters may be mentioned the alkyl esters such as triethyl, tris(2-ethylhexyl), and di-n-butyl borate and the aryl esters such as tri-phenyl or tri-β-naphthyl borate. Alicyclic and heterocyclic esters of boric acids are similarly useful.

The invention is further illustrated, but not limited, by the following example:

Example

In this example there is summarized a series of experiments which were made according to the following general procedure:

Into a three-necked flask fitted with an agitator, thermometer, condenser and an inlet tube there were placed the fatty unsaturated acid, the maleic anhydride and the boron compound. The molar ratio of maleic anhydride : oleic acid used varied between 1.0:1.25. The off gases or traces of maleic anhydride were collected over very dilute aqueous sodium hydroxide and a few drops of phenolphthalein.

The whole mixture was heated during a 30 minute period from room temperature up to 200° C. (liquid temperature). An inert gas, i. e., nitrogen, was bubbled through the liquid during the first 15 minutes of the half-hour heating period. After a 4 to 6 hour heating period at the temperatures indicated in the table below, the mixture was cooled to approximately 150° C., then treated with clay and a filter aid, and stirred for 30 minutes. The reaction mixture was subsequently treated with charcoal and stirring was continued for an additional 30 minutes at 150 to 165° C. The product was then filtered over a filter aid. The filtrate was diluted with ether, washed several times with water and the wash water was analyzed for maleic anhydride. Low boiling materials were removed by heating the residue for 1 to 2 hours at 100° C., bath temperature at 1 mm. Hg. The yields varied between 86 to 96 per cent and are based on the determination of unreacted maleic anhydride found in the filtrate and in the solid residue. This method was also checked by polarographic determination of maleic anhydride found in the filtrate before and after the water wash.

| Experiment No. | 1 | 2 | 3 | 4 | 5 | 6 |
|---|---|---|---|---|---|---|
| Emersol-233 [1] | 13.8 | | 13.8 | | | |
| Ahcolein-810 [1] | | 13.8 | | 13.8 | 13.8 | |
| 10-Undecylenic Acid | | | | | | 9.85 |
| Maleic Anhydride | 6.0 | 6.0 | 6.0 | 6.0 | 6.0 | 6.0 |
| Per Cent Boric Acid [2] | 1.5 | 1.5 | 3.0 | 3.0 | 0.0 | 1.5 |
| Mole Ratio: Maleic Anhydride to Fatty Acid | 1.25 | 1.25 | 1.25 | 1.25 | 1.25 | 1.25 |
| Heating Time [3] (Hrs.) | 4 | 4 | 4 | 4 | 4 | 5 |
| Temperature, °C | 209 | 209 | 209 | 209 | 209 | 213 |
| Color [4] | 14.0 | 13.6 | 12.5 | 12.2 | 16.6 | 13 |

[1] Emersol-233 (Emery Ind.) and Ahcolein-810 (Arnold, Hoffman) represent distilled oleic acid, technical.
[2] Based on charged maleic anhydride.
[3] After reaction mixture had been brought to 200° C.
[4] Gardner scale (Gardner Color Standards for varnishes, oils and lacquers).

Quantities of reactants indicated above are parts by weight. All of the above experiments were carried out in large test tubes fitted with cork stoppers wrapped in metal foil. All were heated simultaneously in the same oil bath.

As shown in the above table, in the "blank" Experiment 5, the color of the adducts on the Gardner scale was 16.6. The efficiency of the introduced boron compound is shown by the decreased color value of the adducts prepared in the presence of boric acid. Inasmuch as each unit in the upper range of the Gardner scale, i. e., in color values of from 12 to 16 represents a decidedly significant color change, the results obtained by the present process are remarkable.

Inasmuch as formation of the present adducts involves addition of one mole of the maleic anhydride with one mole of the fatty acid compound, these reactants should be present in substantially stoichiometric proportions. However, the quantity of either reactant actually present in the initial mixture is unimportant, in that any excess material is readily recoverable from the final reaction mixture. The reaction is effected at temperatures which are below the decomposition points of either the reactants or the product, and preferably between temperatures of, say, between 150° C. to 300° C.

Although the above example shows only the use of oleic and undecylenic acids as the fatty acid components, other monoolefinic, unsubstituted fatty acids may be similarly reacted with maleic anhydride in the presence of the present boron compounds to give adducts of good color. Also instead of using the free fatty acids, there may be employed esters of the same with aliphatic, unsubstituted alcohols of from 1 to 8 carbon atoms, e. g., methyl, ethyl, isopropyl, n-hexyl or 2-ethylhexyl undecylenate or oleate, the adducts thus obtained being clearer and lighter in color than adducts prepared by prior methods.

While I prefer to add the boron compound to the mixture of maleic anhydride and the fatty acid component before initiating the reaction, good results are obtained when the present boron compounds are added at an intermediate stage of the reaction. For example, the reaction mixture may be heated for a time of, say, one to two hours in the absence of the boron compound, and the reaction interrupted for addition of the latter. However, color improvement is not so pronounced.

While the addition of maleic anhydride with mono-olefinic, unsubstituted acids occurs readily at ordinary atmospheric pressures, with some reactants use of lower or greater pressures is advantageous. The addition reaction may also be effected in the presence of an inert diluent boiling above 180° C., the use of a diluent being recommended when working with the higher esters, e. g., n-octyl oleate, or when operating with large quantities of reactants.

What I claim is:

1. The process of preparing adducts which comprises heating, at temperatures of from 150° C. to 300° C., a mixture comprising maleic anhydride, a fatty acid compound having the general formula $$YCOOZ$$

wherein Y is an mono-olefinic, aliphatic hydrocarbon residue of from 9 to 23 carbon atoms and Z is a member of the group consisting of hydrogen and alkyl radicals of from 1 to 8 carbon atoms, and a boron compound which is a member of the group consisting of boric anhydride, boric acids, and the salts and esters of boric acids, the said boron compound being from 0.5 per cent to 5.0 per cent by weight of the weight of the maleic anhydride.

2. The process of claim 1 further defined in that the fatty acid compound is oleic acid.

3. The process of claim 2 further defined in that the fatty acid compound is undecylenic acid.

4. The process of preparing adducts which comprises heating, at temperatures of from 150° C. to 300° C., a mixture comprising maleic anhydride and oleic acid in the presence of a boric acid, the quantity of said boric acid being from 0.5 per cent to 5.0 per cent by weight of the weight of the maleic anhydride.

5. The process of preparing adducts which comprises heating, at temperatures of from 150° C. to 300° C., a mixture comprising maleic anhydride and oleic acid in the presence of an ester of a boric acid, the quantity of said ester being from 0.5 per cent to 5.0 per cent by weight of the weight of the maleic anhydride.

6. The process of preparing adducts which comprises heating, at temperatures of from 150° C. to 300° C., a mixture comprising maleic anhydride and oleic acid in the presence of a salt of a boric acid, the quantity of said salt being from 0.5 per cent to 5.0 per cent by weight of the weight of the maleic anhydride.

7. The process of preparing adducts which comprises heating, at temperatures of from 150° C. to 300° C., a mixture comprising maleic anhydride and undecylenic acid in the presence of a boric acid, the quantity of said boric acid being from 0.5 per cent to 5.0 per cent by weight of the weight of the maleic anhydride.

8. The process of preparing adducts which comprises heating, at temperatures of from 150° C. to 300° C., a mixture comprising maleic anhydride and undecylenic acid in the presence of an ester of a boric acid, the quantity of said ester being from 0.5 per cent to 5.0 per cent by weight of the weight of the maleic anhydride.

9. The process of preparing adducts which comprises heating, at temperatures of from 150° C. to 300° C., a mixture comprising maleic anhydride, an ester of a mono-olefinic fatty acid of from 10 to 24 carbon atoms and an aliphatic, unsubstituted alcohol of from 1 to 8 carbon atoms, and a boron compound which is a member of the group consisting of boric anhydride, boric acids and salts and esters of boric acids, the quantity of said boron compound being from 0.5 per cent to 5.0 per cent by weight of the weight of the maleic anhydride.

10. The process of preparing adducts which comprises heating, at temperatures of from 150° C. to 300° C., a mixture comprising maleic anhydride, an ester of a mono-olefinic fatty acid of from 10 to 24 carbon atoms and an aliphatic, unsubstituted alcohol of from 1 to 8 carbon atoms, and a boric acid, the quantity of the said boric acid being from 0.5 per cent to 5.0 per cent by weight of the weight of the maleic anhydride.

11. The process of preparing adducts which comprises heating, at temperatures of from 150° C. to 300° C., a mixture comprising maleic anhydride, an ester of a mono-olefinic fatty acid of from 10 to 24 carbon atoms and an aliphatic, unsubstituted alcohol of from 1 to 8 carbon atoms, and an ester of a boric acid, the quantity of the boric ester being from 0.5 per cent to 5.0 per cent by weight of the weight of the maleic anhydride.

12. The process of preparing adducts which comprises heating, at temperatures of from 150° C. to 300° C., a mixture comprising maleic anhydride, an ester of a mono-olefinic fatty acid of from 10 to 24 carbon atoms and an aliphatic, unsubstituted alcohol of from 1 to 8 carbon atoms and a salt of a boric acid, the quantity of the salt being from 0.5 per cent to 5.0 per cent by weight of the weight of the maleic anhydride.

13. The process of preparing adducts which comprises heating, at temperatures of from 150° C. to 300° C., a mixture comprising maleic anhydride, an ester of oleic acid and an aliphatic, unsubstituted alcohol of from 1 to 8 carbon atoms, and a boron compound which is a member of the group consisting of boric anhydride, boric acids and the salts and esters of boric acids, the quantity of said boron compound being from 0.5 per cent to 5.0 per cent by weight of the weight of the maleic anhydride.

14. The process of preparing adducts which comprises heating, at temperatures of from 150° C. to 300° C., a mixture comprising maleic anhydride, an ester of oleic acid and an aliphatic, unsubstituted alcohol of from 1 to 8 carbon atoms, and a boric acid, the quantity of said boric acid being from 0.5 per cent to 5.0 per cent by weight of the weight of the maleic anhydride.

15. The process of preparing adducts which comprises heating, at temperatures of from 150° C. to 300° C., a mixture comprising maleic anhydride, an ester of oleic acid and an aliphatic alcohol of from 1 to 8 carbon atoms, and an ester of a boric acid, the quantity of said boric ester being from 0.5 per cent to 5.0 per cent by weight of the weight of the maleic anhydride.

16. The process of preparing adducts which comprises heating, at temperatures of from 150° C. to 300° C., a mixture comprising maleic anhydride, an ester of oleic acid and an aliphatic alcohol of from 1 to 8 carbon atoms and a salt of a boric acid, the quantity of said salt being from 0.5 per cent to 5.0 per cent by weight of the weight of the maleic anhydride.

17. The process of preparing adducts which comprises heating, at temperatures of from 150° C. to 300° C., a mixture comprising maleic anhydride, oleic acid and an aryl ester of a boric acid, the quantity of said boric ester being from 0.5 per cent to 5.0 per cent by weight of the weight of the maleic anhydride.

18. The process of preparing adducts which comprises heating, at temperatures of from 150° C. to 300° C., a mixture comprising maleic anhydride, oleic acid and an alkyl ester of a boric acid, the quantity of said boric ester being from 0.5 per cent to 5.0 per cent by weight of the weight of the maleic anhydride.

19. The process of preparing adducts which comprises heating, at temperatures of from 150° C. to 300° C., a mixture comprising maleic anhydride, oleic acid and boric acid, the quantity of said boric acid being from 0.5 per cent to 5.0 per cent by weight of the weight of the maleic anhydride.

MILTON KOSMIN.

No references cited.